(12) United States Patent
Zarubinsky et al.

(10) Patent No.: US 6,683,926 B2
(45) Date of Patent: Jan. 27, 2004

(54) GAIN CONTROLLER WITH COMPARATOR OFFSET COMPENSATION FOR CIRCUIT HAVING IN-PHASE AND QUADRATURE CHANNELS

(75) Inventors: Michael Zarubinsky, Jerusalem (IL); Ronen Paz, Hadera (IL); Vladimir Koifman, Rishon-Lezion (IL)

(73) Assignee: Motorola, Inc., Schaumburg, IL (US)

( * ) Notice: Subject to any disclaimer, the term of this patent is extended or adjusted under 35 U.S.C. 154(b) by 568 days.

(21) Appl. No.: 09/740,336

(22) Filed: Dec. 18, 2000

(65) Prior Publication Data

US 2002/0114413 A1 Aug. 22, 2002

(51) Int. Cl.[7] .......................... H04L 27/08; H04B 17/02
(52) U.S. Cl. ...................................... 375/345; 455/138
(58) Field of Search .................................. 375/345, 316, 375/317; 455/138, 136, 137, 219, 232.1, 250.1

(56) References Cited

U.S. PATENT DOCUMENTS

| | | | |
|---|---|---|---|
| 4,633,315 A | 12/1986 | Kasperkovitz | 358/188 |
| 4,799,212 A | 1/1989 | Mehrgardt | 370/20 |
| 4,926,443 A | 5/1990 | Reich | 375/102 |
| 5,095,533 A | 3/1992 | Loper et al. | 455/245 |
| 5,095,536 A | 3/1992 | Loper | 455/324 |
| 5,179,730 A | 1/1993 | Loper | 455/266 |
| 5,230,099 A | 7/1993 | Loper | 455/324 |
| 5,249,203 A | 9/1993 | Loper | 375/97 |
| 5,604,929 A | 2/1997 | Loper et al. | 455/324 |
| 5,659,582 A * | 8/1997 | Kojima et al. | 375/345 |
| 5,930,286 A | 7/1999 | Walley | 375/200 |

OTHER PUBLICATIONS

"Interpolation and Decimation of Digital Signals—A Tutorial Review" by Crochiere, R. E. and Rabiner, L. R., Proceedings of the IEEE, vol. 69, No. 3, Mar. 1981.

"Multirate Digital Signal Processing" excerpt of "Digital Signal Processing", Third Edition, Prentice Hall, Upper Saddle River, 1996 by Proakis, J. G.and Manolakis, D. G., ISBN: 0–13–373762–4, sections 10.1 to 10.6 of chapter 10.

"Compensation of frequency dependent quadrature imbalance in a zero-if downconverter" by J. Michels and S. Jasper, excerpt of Motorola Technical Developments, vol. 38, Jun. 1999, pp. 183–186.

* cited by examiner

*Primary Examiner*—Khai Tran

(57) ABSTRACT

In a radio circuit (299) that forwards a signal pair (I,Q) by first (291, I) and second (292, Q) channels, by converting the signal pair (I,Q) from a digital form ($I_D$, $Q_D$) to an analog form ($I_A$, $Q_A$), a gain controller (200) monitors differences between the overall gains ($G_I$, $G_Q$) in the channels and corrects a gain imbalance by feeding back a gain determining control signal (W) to one of the channels. The gain controller (200) has digital comparators (221–224) at the inputs (281, 282) of the channels and analog comparators at the outputs (283, 284) of the channels. Intrinsic offsets of the analog comparators are determined and compensated by subtracting corresponding offsets from the digital comparators.

6 Claims, 4 Drawing Sheets

GAIN CONTROLLER WITH COMPARATOR OFFSET COMPENSATION FOR CIRCUIT HAVING IN-PHASE AND QUADRATURE CHANNELS

RELATED APPLICATION

The present application is related to Ser. No. 09/572,558, titled "Gain Controller for Circuit having In-phase and Quadrature Channels, and Method", filed May 16, 2000.

FIELD OF THE INVENTION

The present invention generally relates to electronic circuits having in-phase and quadrature channels, and more particularly, to a gain controller for such circuits.

BACKGROUND OF THE INVENTION

Receiver circuits and transmitter circuits (collectively "radio circuits") of the direct conversion type are often used for radio frequency (RF) filtering in communication devices such as mobile phones, television receivers or the like.

Such a radio circuit uses signal pairs having an in-phase signal (I) and a quadrature signal (Q). Both signals I and Q have a substantially equal carrier frequency. The Q signal is 90° phase shifted to the I signal. In other words, both signals are in quadrature to each other.

The radio circuit has a first channel for the I signal and second channel for Q signal. Each channel independently forwards and processes its signal, for example by digital-to-analog converting and low-pass filtering. Other signal processing is also possible, for example, analog-to-digital converting. Exact processing of the I and Q signals requires, among other things, that both signals have the same amplitude.

However, differences in the gains (amplitude transfer function) of the channels commonly occur as a result of changes in temperature, frequency, manufacturing variations of the electrical components and other parameters. Small gain differences, ("mismatch") can result in distortions that lead to unwanted discrete tones in further circuitry coupled to the radio circuit. Useful references can be found in U.S. Pat. Nos. 5,604,929; 5,249,203; 5,230,099; 5,179,730; 5,095,536; 5;095;533, all to Looper; as well as in U.S. Pat. No. 4,926,443 to Reich; U.S. Pat. No. 4,633,315 to Kasperkovitz; U.S. Pat. No. 5,930,286 to Walley; and U.S. Pat. No. 4,799,212 to Mehrgardt.

The present invention seeks to provide an improved gain controller which mitigates or avoids disadvantages and limitations of the prior art.

DETAILED DESCRIPTION OF A PREFERRED EMBODIMENT

For convenience, a glossary of terms used here and their definitions is provided prior to the claims.

The following explanation uses abbreviations such as "A" for "analog", "D" for "digital"; "P" for "plus"; "N" for "minus"; and the ellipsis " . . . " collectively for either P or N. Arrows in signal lines of the block diagrams illustrate a preferred signal flow.

Figure 1:
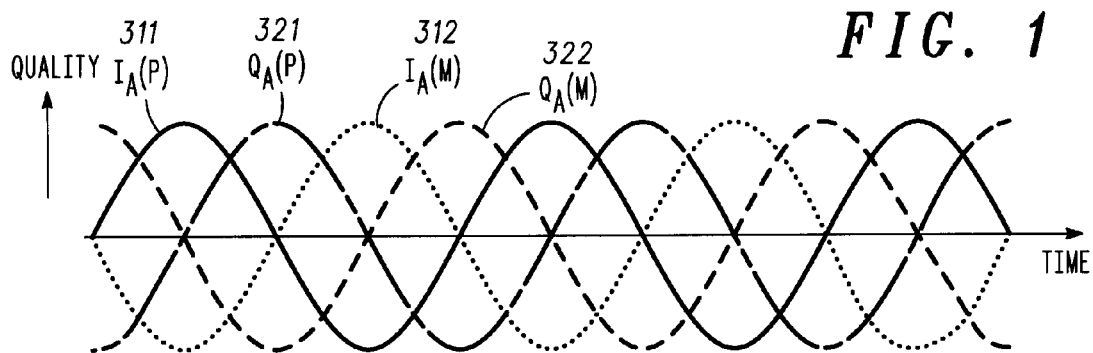
FIG. 1 illustrates a simplified time diagram of a signal pair with an in-phase signal and a quadrature signal.

FIG. 1 illustrates a simplified time diagram of the signal pair I,Q with the in-phase signal I (traces 311, 312) and— shifted by substantially 90°—the quadrature signal Q (traces 321, 322). The horizontal axis shows the time t, and the vertical axis shows a physical quantity of the signals, such as voltage, current or the like.

FIG. 1 shows the signals conveniently as analog signals (index "A"); digital signals (index "D") can be defined similarly.

Signals $I_A$ and $Q_A$ each are differential signals each with a first component (traces 311, 321) and a second component (dashed traces 312, 322). For convenience of further explanation, first and second components are referred to as "plus" (P) and "minus" (M) components: component $I_A(P)$ by trace 311, component $I_A(M)$ by trace 312, component $Q_A(P)$ by trace 321, and component $Q_A(M)$ by trace 322.

In the following discussion, the sine shape of the signals is only intended to be a non-limiting example; any other shapes are possible.

Figure 2:
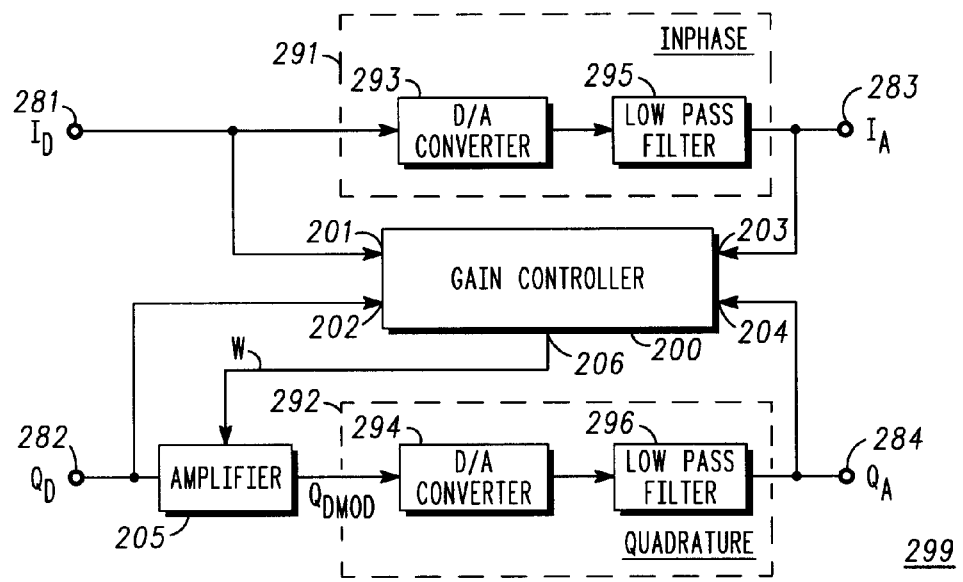
FIG. 2 illustrates a simplified block diagram of a circuit having in-phase and quadrature channels that is controlled by a gain controller according to the present invention.

FIG. 2 illustrates a simplified block diagram of radio circuit 299 having in-phase channel 291 (dashed frame) and quadrature channel 292 (dashed frame) that is controlled by gain controller 200 according to the present invention.

Explaining the present invention for two channels 291, 292 is convenient, but not necessary for the present invention. Persons of skill in the art are able, based on the description herein, to implement controller 200 also for applications with further channels without departing from the scope of the present invention.

The term "in-phase" is therefore intended to be only a convenient abbreviation for signals and elements (like channel, input, output, etc. ) in a "first" channel; and the term "quadrature" is an abbreviation for signals and elements in a "second" channel.

Gain controller 200 can be used in a variety of telecommunication and other applications, for example, cellular phones operating according to international standards, such as for example CDMA (Code Division Multiple Access) and GSM (Global System for Mobile Communication). Gain controller 200 according to the present invention is therefore conveniently explained with the assumption that circuit 299 belongs to a radio receiver. By in-phase channel 291, circuit 299 forwards an in-phase input signal (e.g., signal $I_D$) to in-phase output signal (signal $I_A$). By quadrature channel 292, circuit 299 forwards a quadrature input signal (e.g., signal $Q_D$) to quadrature output signal (e.g., signal $Q_A$). As illustrated, input signals are digital signals; and output signals are analog signals. This is convenient, but not essential. Persons of skill in the art can modify circuit 299 (analog input, digital output, both analog, both digital).

In circuit 299, in-phase channel 291 comprises digital-to-analog converter (DAC) 293 and low-pass filter (LPF) 295 to convert digital in-phase signal $I_D$ present at digital in-phase input 281 to analog in-phase signal $I_A$ at analog in-phase output 283. Quadrature channel 292 comprises DAC 294 and LPF 296 to convert digital quadrature signal $Q_D$ present at digital quadrature input 282 to analog quadrature signal $Q_A$ at analog quadrature output 284.

The overall gains $G_I = I_A/I_D$ and $G_Q = Q_A/Q_D$ in both channels 291 and 292, respectively, should substantially be equal. Gain controller 200 has input 201 coupled to input 281 to receive digital in-phase signal $I_D$; input 202 coupled to input 282 to receive digital quadrature signal $Q_D$; input 203 coupled to output 283 to receive analog in-phase signal $I_A$; and input 204 coupled to output 284 to receive analog quadrature signal $Q_A$.

Preferably, digital signals $I_D$ and $Q_D$ are represented by multiple bits. During processing, optional quantizers (details later) can reduce the number of bits, for example to one ("single-bit").

In a feedback arrangement, gain controller 200 obtains gain control signal W (available at output 206). Preferably, signal W controls gain amplifier 205 that is coupled between digital quadrature input 282 and DAC 294. Multiplier controls the quantity of signal $Q_D$ that goes into DAC 294. The amplitude of signal $Q_D$ (before amplifier 205) is related to the amplitude of modified signal $Q_{D\ MOD}$ (after amplifier 205) by gain L ($L = Q_{D\ MOD}/Q_D$). In such a way, relative differences ($G_I/G_Q$) and absolute differences ($G_I - G_Q$) between overall gains $G_I$ and $G_Q$ are avoided.

Having amplifier 205 associated with quadrature channel 292 is convenient for explanation but not necessary for the present invention. Those of skill in the art are able, based on the description herein, to couple amplifier 205 also to in-phase channel 291 without departing from the scope of the present invention.

Before explaining details of gain controller 200, sampling rates of digital signals are discussed.

Figure 3:
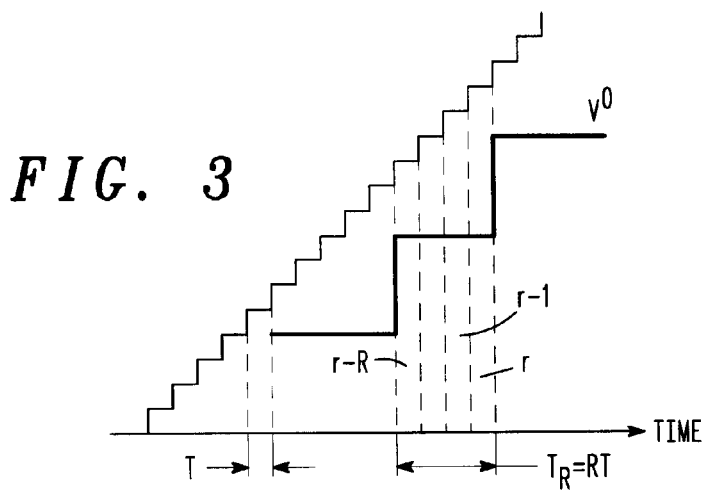
FIG. 3 illustrates a simplified time diagram of digital signals having first and second sampling rates.

FIG. 3 illustrates a simplified time diagram of digital signal $V_D$ having a first sampling rate and digital signal $V°$ having a second sampling rate.

Digital signal $V_D$ has substantially constant magnitudes during first time intervals T (hereinafter "time slots"). In other words, signal $V_D$ is sampled at first sampling rate $F = 1/T$. Digital signal $V_D$ stands for digital signals like $I_D$ and $Q_D$ (FIG. 2) and $X_D, Y_D, X_A, Y_A, \Delta X, \Delta Y$ (cf. FIG. 5). When writing $V_D(r)$, time slots T are conveniently identified by indices r, r-1, r-2, ... r-R.

Internally, gain controller 200 also uses signals V° that have substantially constant magnitudes during second, longer time intervals $T_R = R*T$ (hereinafter "time frames"). In other words, such signals are sampled with the predetermined second, lower sampling rate $F_R = 1/T_R = F/R$. R is a sampling rate decimation ratio. Preferably, R is an integer, but real ratios can also be used. In other words, R indicates the number of time slots per time frame.

For any time frame $T_R = R*T$ ending with a time slot identified by index r, an average $V_{AVERAGE}$ of $V_D(r)$, can be defined as follows:

$$V_{AVERAGE} = \frac{1}{R} * \sum_{j=0}^{R-1} V(r-j) \quad (1)$$

Figure 5:
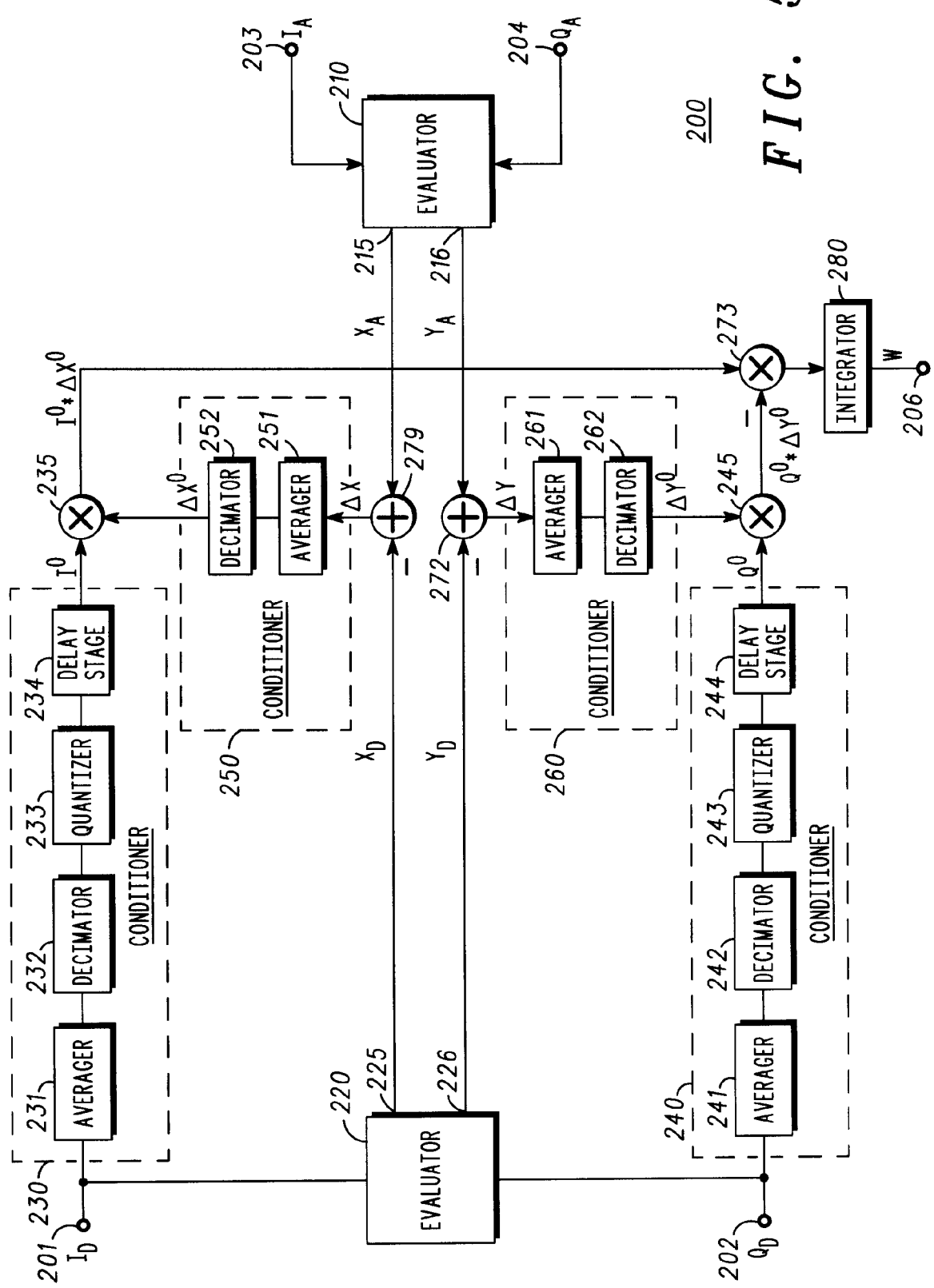
FIG. 5 illustrates a simplified block diagram of the gain controller of FIG. 2 with more detail.

Controller 200 internally uses rate decimation where signals $V_D$ are converted to signals V° (e.g., $\Delta X°, \Delta Y°, I°, Q°$, cf. FIG. 5).

For the application of sampling rate decimators, the following references are useful: Crochiere, R. E. and Rabiner, L. R.: "Interpolation and Decimation of Digital Signals—A Tutorial Review", Proceedings of the IEEE, vol. 69, No.3, March 1981; and Proakis, J. G., Manolakis, D. G.: "Digital Signal Processing", Third Edition, Prentice Hall, Upper Saddle River, 1996, ISBN 0-13-373762-4, sections 10.1 to 10.6 of chapter 10 "Multirate Digital Signal Processing".

Figure 4:
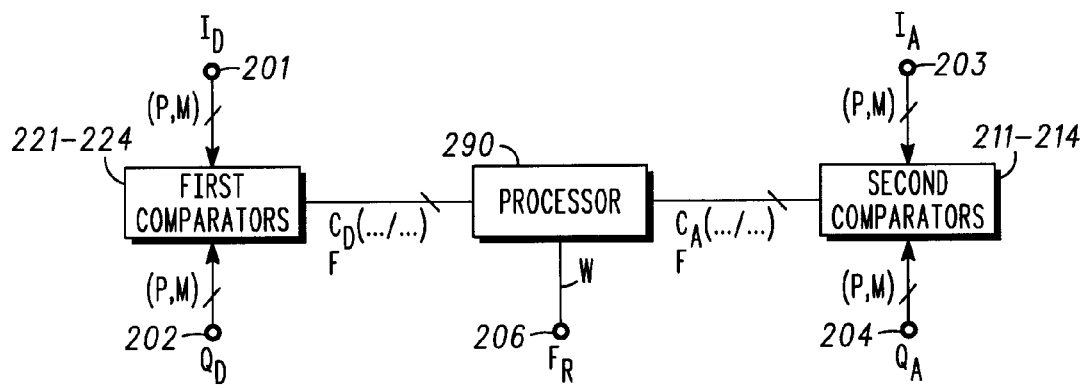
FIG. 4 illustrates a simplified block diagram of the gain controller of FIG. 2.

FIG. 4 illustrates a simplified block diagram of gain controller 200 according to the present invention. Gain controller 200 provides control signal W at output 206 that (by varying L) adjusts the overall gain in either ("first") in-phase channel 291 or ("second") quadrature channel 292 of circuit 299 (cf. FIG. 5). Gain controller 200 comprises a first plurality of comparators 221–224 (details FIG. 8), a second plurality of comparators 211–214 (details FIG. 6), and signal processing circuit 290.

In the first plurality of comparators, each comparator 221, 222, 223, 224 compares one of first (e.g., $I_D(P)$) and second (e.g., $I_D(M)$) components of the in-phase input signal (e.g., $I_D$ at input 201) to one of first (e.g., $Q_D(P)$) and second (e.g., $Q_D(M)$) components of the quadrature input signal (e.g., $Q_D$ at input 202). Each comparator 221, 222, 223, 224 provides a single-bit "input related" intermediate signal (e.g., $C_D(\ldots, \ldots)$) at the first sampling rate F.

In the second plurality of comparators, each comparator 211, 212, 213, 214 compares one of first (e.g., $I_A(P)$) and second (e.g., $I_A(M)$) components of the in-phase output signal (e.g., $I_A$ at input 203) to one of first (e.g., $Q_A(P)$) and second (e.g., $Q_A(M)$) components of the quadrature output signal (e.g., $Q_A$ at output 204). Each comparator 211, 212, 213, 214 provides a single-bit "output related" intermediate signal ($C_A(\ldots, \ldots)$) at first sampling rate F.

Signal processing circuit 290 receives the "input related" single-bit intermediate signal (e.g., $C_D(\ldots, \ldots)$) from each of comparators 221, 222, 223, 224 (first plurality) and receives the "output related" single-bit intermediate signal (e.g., $C_A(\ldots, \ldots)$) from each of comparators 211, 212, 213, 214 (second plurality) and integrates a predetermined combination of the single-bit intermediate signals (example explained later) to control signal W (output 206) at the second, lower sampling rate $F_R$.

Using comparators that output single-bit signals is an important advantage of the present invention and avoids the use of precise multi-bit converters. As explained later (FIG. 9), intrinsic comparator offsets can be compensated.

In connection with the following figures, signal processing circuit 290 is explained with dedicated hardware elements such as, for example, combiners 217, 218, 227, 228, (in evaluators 210, 220), conditioners 230, 240, 250, 260, adders 271, 272, 273, multipliers 235, 245, and integrator 280. This is convenient for explanation, but not limited thereto. Persons of skill in the art are able, based on the description herein, to implement the function of processing circuit 290 by a digital signal processor (DSP) or other general purpose processor such as a microprocessor, without departing from the scope of the present invention.

FIG. 5 illustrates a simplified block diagram of gain controller 200. Gain controller 200 comprises signal evaluator 210 (details in FIGS. 6–7), signal evaluator 220 (details in FIG. 8), signal conditioners 230, 240, 250, 260 (dashed frames), adders 271, 272, 273, multipliers 235, 245, and integrator 280.

Signal conditioner 230 comprises averager 231 (symbol Σ), decimator 232 (symbol ↓), quantizer 233, and delay stage 234. Signal conditioner 240 comprises averager 241, decimator 242, quantizer 243, and delay stage 244. Signal conditioner 250 comprises averager 251 and decimator 252. Signal conditioner 260 comprises averager 261 and decimator 262.

Signal conditioner 230 receives digital in-phase signal $I_D$ having the sampling rate F at input 201 and provides conditioned in-phase signal I° having the lower sampling rate $F_R$ (at output of stage 234). Similarly, conditioner 240 receives digital quadrature signal $Q_D$ (sampling rate F, input 202) and provides conditioned quadrature signal Q° (sampling rate $F_R$, output of stage 244). Signal conditioners 250 and 260 condition difference signals ΔX (from adder 271, see below) and ΔY (from adder 272) to signals ΔX° and ΔY°, respectively, by converting to rate $F_R$. In other words, signals ΔX° and ΔY° are $F_R$ rate representations of difference signals ΔX° and ΔY°, respectively.

For conditioning, the conditioners use averagers 231, 241, 251, 261 to provide averages (cf. equation (1)) and decimators 232, 242, 252, 262 to decimate from rate F to rate $F_R$, and—optionally—quantizers 233, 243 to convert multi-bit signals, preferably, to single-bit signals; and delay stages 234, 244 for synchronization purposes.

Signal evaluator 210 receives analog in-phase signal $I_A$ and analog quadrature signal $Q_A$ (at inputs 203, 204, respectively) and provides combination signals $X_A$ and $Y_A$ (at outputs 215, 216, respectively). Similarly, signal evaluator 220 receives digital in-phase signal $I_D$ and digital quadrature signal $Q_D$ (at inputs 201, 201, respectively) and provides combination signals $X_D$ and $Y_D$ (at outputs 225, 226, respectively). Preferably, signals $X_A$, $Y_A$, $X_D$ and $Y_D$ are at sampling rate F. Details on how signals $X_A$, $Y_A$, $X_D$ and $Y_D$ are obtained are explained in connection with FIGS. 6–8.

Adder 271 provides difference signal ΔX by subtracting signal $X_D$ from signal $X_A$; adder 272 provides difference signal ΔY by subtracting signal $Y_D$ from signal $Y_A$ (cf. the minus symbols). Preferably, signals ΔX and ΔY keep sampling rate F.

Multiplier 235 receiving I° and ΔX° forwards the intermediate product I°*ΔX° to adder 273; similarly, multiplier 245 receiving Q° and ΔY° forwards the intermediate product Q°*ΔY° to adder 273. Adder 273 forwards the difference I°*ΔX°−Q°*ΔY° to integrator 280. Integrator 280 provides above mentioned gain control signal W at output 206 (cf. FIG. 2). Signal W controls amplifier 205 (cf. FIG. 2) such that quadrature signal $Q_D$ at input 282 (cf. FIG. 2) is forwarded to DAC 294 as $Q_{D\ MOD}$ with the gain L=1+W. Thereby, the feedback control loop from outputs 282, 284 to channels 291, 292 is formed. Details about signal W are explained later.

Figure 6:
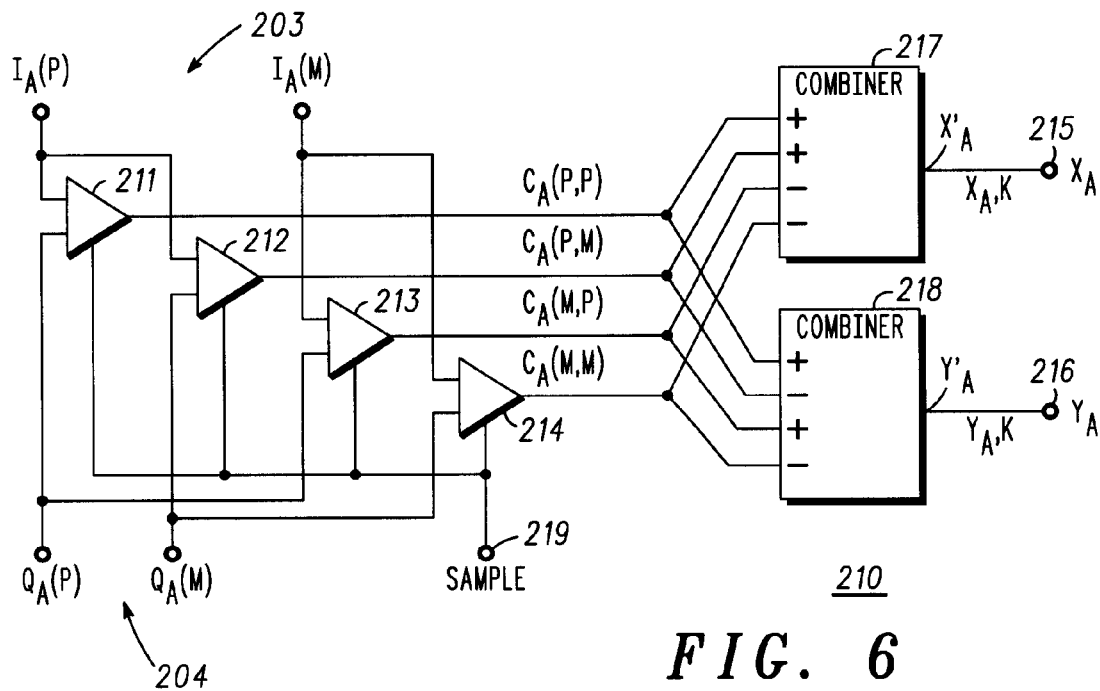
FIG. 6 illustrates a simplified block diagram of a signal evaluator in the gain controller of FIG. 5.

FIG. 6 illustrates a simplified block diagram of signal evaluator 210 in gain controller 200 (cf. FIG. 5). Signal evaluator 210 comprises analog comparators 211, 212, 213, and 214 and combiners 217 and 218.

Each of comparators 211, 212, 213, 214 has a first input to receive a component $I_A(\ldots)$ from input 203 (cf. FIGS. 1,2,4,5), a second input to receive a component $Q_A(\ldots)$ from input 204 (cf. FIGS. 1,2,4,5), and an output to provide the above mentioned single-bit intermediate signal $C_A(\ldots, \ldots)$. $C_A(\ldots, \ldots)$ is "output related" because it is derived from outputs 283 and 284 of circuit 299.

Combiners 217 and 218 receive signals $C_A(\ldots, \ldots)$ and send above mentioned signals $X_A$ and $Y_A$ to output 215 and 216, respectively.

Preferably, comparators 211, 212, 213, and 214 receive sample signal SAMPLE at rate F from input 219 to output an updated intermediate signal $C_A(\ldots, \ldots)$ once in each time slot T.

Preferably, each analog comparator 211, 212, 213, and 214 is a single-bit analog-to-digital converter. In other words, intermediate signal $C(\ldots, \ldots)$ can assume only two magnitudes, for example, "+1" and "−1", indicating a first and a second logical state, respectively.

In an ideal case, each comparator outputs signal $C_A(\ldots, \ldots)$ in the first state when component $I_A(\ldots)$ is larger than or equal to component $Q_A(\ldots)$; and outputs signal $C_A(\ldots, \ldots)$ is the second state when component $I_A(\ldots)$ is smaller than component $Q_A(\ldots)$, that is $$C_A(\ldots, \ldots) = \text{"+1"} \text{ for } I_A(\ldots)-Q_A(\ldots) \geq 0 \quad (2)$$

$$C_A(\ldots, \ldots) = \text{"−1"} \text{ for } I_A(\ldots)-Q_A(\ldots) < 0 \quad (4)$$

However, in the non-ideal case, this statements are extended by introducing comparator offsets $O_A(\ldots, \ldots)$, for example:

$$C_A(\ldots, \ldots) = \text{"+1"} \text{ for } I_A(\ldots)-Q_A(\ldots) \geq O_A(\ldots, \ldots)$$

$$C_A(\ldots, \ldots) = \text{"−1"} \text{ for } I_A(\ldots)-Q_A(\ldots) < O_A(\ldots, \ldots)$$

Offsets $O_A(P,P)$, $O_A(P,M)$, $O_A(M,P)$, and $O_A(M,M)$ may be different for each comparator 211, 212, 213, and 214, respectively, and can assume positive and negative values.

The comparators receive the components and provide the output related single-bit signals as follows: Comparator 211 receives components $I_A(P)$ and $Q_A(P)$ and provides signal $C_A(P,P)$; comparator 212 receives components $I_A(P)$ and $Q_A(M)$ and provides signal $C_A(P,M)$; comparator 213 receives components $I_A(M)$ and $Q_A(P)$ and provides signal $C_A(M,P)$; comparator 214 receives components $I_A(M)$ and $Q_A(M)$ and provides signal $C_A(M,M)$. The function of combiners 217 and 218 will be explained later.

Figure 7:
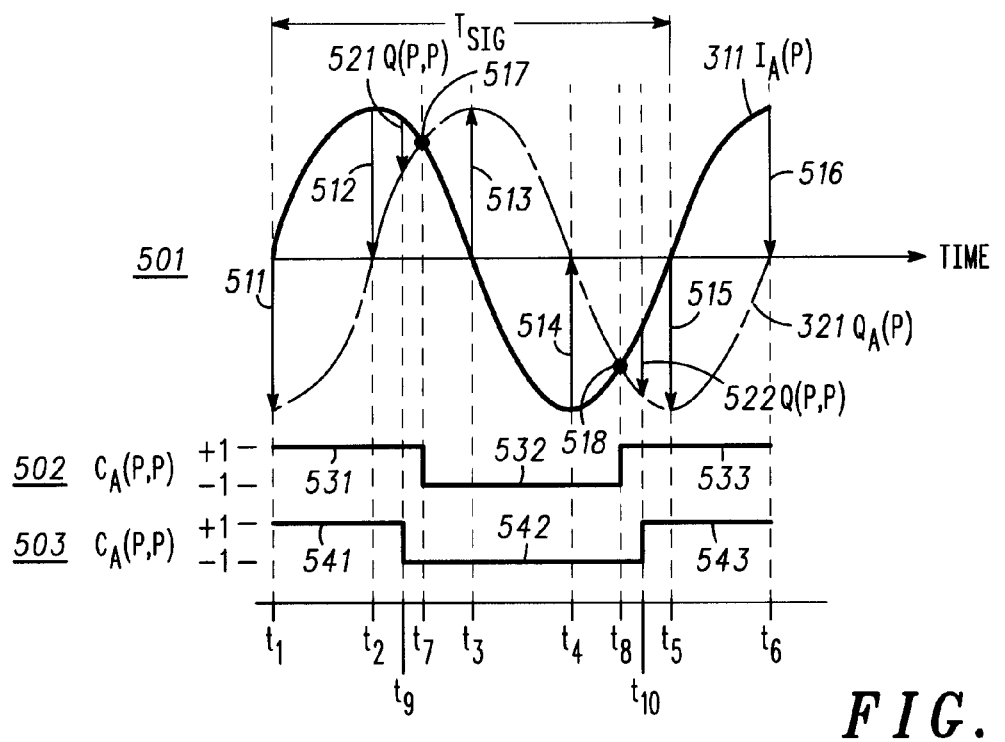
FIG. 7 illustrates, in combination, simplified time diagrams of signal component supplied to an analog comparator in the signal evaluator of FIG. 6 and of an intermediate signal provided by the analog comparator in an ideal case and as distorted by an offset.

FIG. 7 illustrates, in combination, simplified time diagram 501 of a signal component (e.g., $I_A(P)$, bold, trace 311 as in FIG. 1) of in-phase signal I and of a signal component (e.g., $Q_A(P)$, trace 321 as in FIG. 1) of quadrature signal Q that are supplied to an analog comparator (e.g., to 211) in signal evaluator 210 (cf. FIG. 6), simplified time diagram 502 of the intermediate single-bit signal (e.g., $C_A(P,P)$) provided by the analog comparator (e.g., by comparator 211) in an ideal case, and simplified time diagram 503 of that intermediate signal single-bit distorted by the comparator offset (e.g. O(P,P)).

Similar as in FIG. 1, the sine form is only an example. Diagrams 501, 502 and 503 have a common horizontal time axis t with consecutive time points $t_1$ to $t_6$ as well as time points $t_7$ to $t_{10}$. The time points are useful for explanation and must not necessarily be synchronous to time slots T (cf. FIG. 3). Since comparator 211 provides signal $C_A(P,P)$ at rate F that is an oversampling rate in respect to the signal period length $T_{SIG}$ (e.g., $T_{SIG}=t_5-t_2$), the generation of signal $C_A(P,P)$ is expected at any time point.

As in diagram 501, component $I_A(P)$ starts with zero quantity at $t_1$, reaches a positive maximum at $t_2$, again reaches zero at $t_3$, reaches a negative maximum at $t_4$, again reaches zero at $t_5$, and reaches the positive maximum at $t_6$. Component $Q_A(P)$ (that is 90° shifted) has the negative maximum at $t_1$, reaches zero at $t_2$, reaches the positive maximum at $t_3$, reaches zero at $t_4$, reaches the negative maximum at $t_5$, and reaches zero at $t_6$. The period length $T_{SIG}$ is unchanged. Vertical arrows going from $I_A(P)$ to $Q_A(P)$ indicate the difference $I_A(P)-Q_A(P)$ (cf. statements (2)(4)(6)(8)).

Diagram 501 in combination with diagram 502 illustrates an ideal operation of comparator 211 without offset (cf. statements (2)(4)). Down-pointing arrows 511, 512, 515 and 516 at $t_1$, $t_2$, $t_5$, and $t_6$, respectively, stand for signal $C_A(P,P)$ that is "+1". Similarly, for up-pointing arrows 513 and 514 at $t_3$ and $t_4$, respectively, signal $C_A(P,P)$ is "−1". For time points t7 and t8 where the quantities of both components $I_A(P)$ and $Q_A(P)$ are substantially equal, the arrows are reduced to points 517 and 518, respectively, and signal $C_A(P,P)$ is defined as "+1" (cf. (6), diagram 502). Hence, signal $C_A(P,P)$ is "+1" before $t_7$ (trace 531) and after $t_8$ (trace 533) and "−1" in the meantime (trace 532). A signal changing rate is $t_8-t_7=T_{SIG}/2$.

Diagram 501 in combination with diagram 503 illustrates the operation of comparator 211 with offset O(P,P). Down-pointing arrow 521 at $t_9$ represents the offset O(P,P); signal $C_A(P,P)$ goes to "−1" at $t_9$ earlier than in the ideal case (traces 541, 542). Up-pointing arrow 522 at $t_{10}$ again represents the offset O(P,P); signal $C_A(P,P)$ returns to "−1" at $t_{10}$ later than in the ideal case (traces 542, 543). Hence, the signal changing rate of $C_A(P,P)$ becomes asymmetric ($t_{10}-t_9>T_{SIG}/2$).

The offset O(P,P) is also represented by the different length of the "+1" and "−1" intervals of $C_A$ (P,P). As a person of skill in the art will understand without the need of further illustration, amplitude differences between components $I_A(P,P)$ and $Q_A(P,P)$ will also modify these interval lengths.

Therefore, all the signals $C_A(P,P)$, $C_A(P,M)$, $C_A(M,P)$ and $C_A(M,M)$ of comparators 211, 212, 213 and 214, respectively, of signal evaluator 210 (cf. FIG. 6) carry information about the offsets O(..., ...) and the amplitude differences between the signal components. It is now explained how this information is further evaluated.

Coming back to FIG. 6, combiner 217 receives signals $C_A(P,P)$, $C_A(P,M)$, $C_A(M,P)$ and $C_A(M,M)$ and provides signal $X'_A$ according to $$X'_A=\{+C_A(P,P)+C_A(P,M)-C_A(M,P)-C_A(M,M)\} \quad (10)$$

Hence, combiner 217 uses a first summation pattern (++−−), that, in the example, means combining the positive of $C_A(P,P)$, the positive of $C_A(P,M)$, the negative of $C_A(M,P)$ and the negative of $C_A(M,M)$.

Taking into account any noise $x_A$ (lowercase) introduced, for example, by combiner 217, and a constant scaling factor k, the signal $X_A$ that is available at output 215 is estimated as:

$$X_A=k*X'_A+x_A \quad (12)$$

Combiner 218 also receives signals $C_A(P,P)$, $C_A(P,M)$, $C_A(M,P)$ and $C_A(M,M)$ and provides signal $Y'_A$ according to $$Y'_A=\{+C_A(P,P)-C_A(P,M)+C_A(M,P)-C_A(M,M)\} \quad (14)$$

Hence, combiner 218 uses a second summation pattern (+−+−), that, in the example, means combining the positive of $C_A(P,P)$, the negative of $C_A(P,M)$, the positive $C_A(M,P)$ and the negative of $C_A(M,M)$.

Again taking into account any noise $y_A$ (lowercase), for example, introduced by combiner 218, and the factor k, the signal $Y_A$ that is available at output 216 is estimated as:

$$Y_A=k*Y'_A+y_A \quad (16)$$

Figure 8:
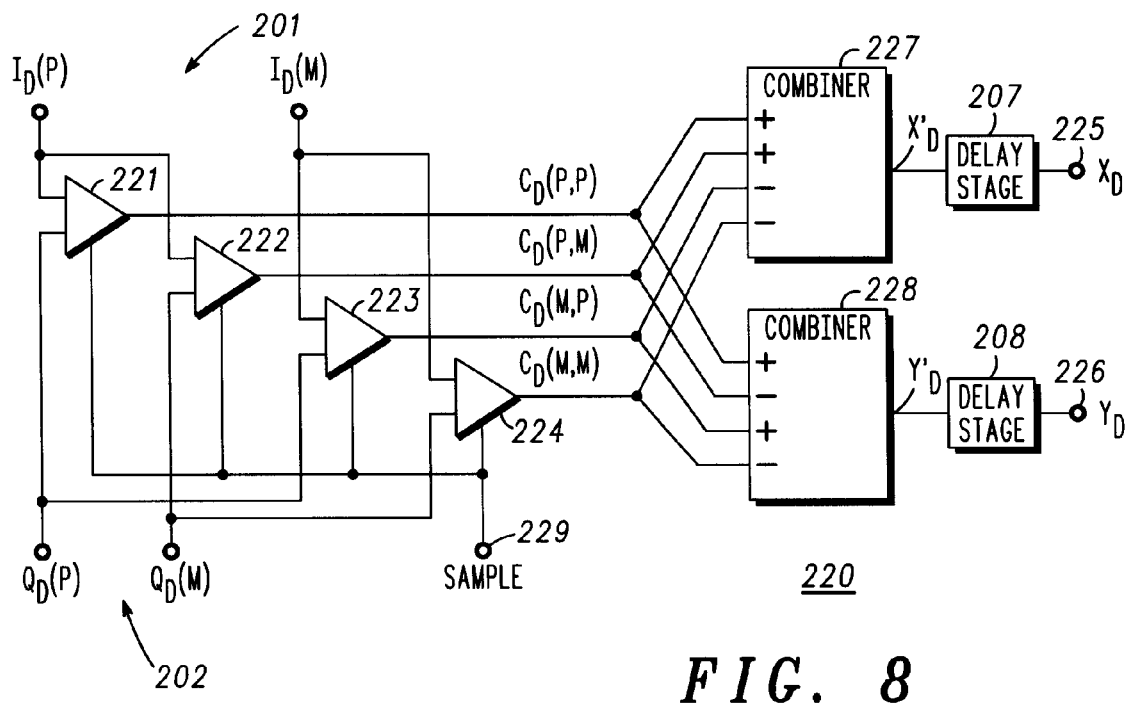
FIG. 8 illustrates a simplified block diagram of a further signal evaluator in the gain controller of FIG. 5.

FIG. 8 illustrates a simplified block diagram of signal evaluator 220 of gain controller 200 (cf. FIG. 5). Signal evaluator 220 comprises digital comparators 221, 222, 223 and 224, combiners 227 and 228, and delay stages 207 and 208. Input signals of evaluator 220 are digital in-phase signal $I_D$ at input 201 and digital quadrature signal $Q_D$ at input 202; and output signals are signals $X_D$ at output 225 and YD at output 226. Comparators 221, 222, 223, 224 are clocked by sample signal SAMPLE from input 229. Preferably, SAMPLE is the same as in evaluator 210 (cf. FIG. 6).

For convenience, signals $I_D$ and $Q_D$ are considered as differential signals each with a first component (P) and a second component (M), wherein $$I_D(M)=-I_D(P) \text{ and} \quad (18)$$

$$Q_D(M)=-Q_D(P). \quad (20)$$

The comparators receive the components $I_D(\ldots)$, $Q_D(\ldots)$ and provide single-bit signals $Q_D(\ldots,\ldots)$. $Q_D(\ldots,\ldots)$ are "input related" because they are derived from inputs 281, 282 of circuit 299.

In detail, comparator 221 receives components $I_D(P)$ and $Q_D(P)$ and provides signal $C_D(P,P)$; comparator 222 receives components $I_D(P)$ and $Q_D(M)$ and provides signal $C_D(P,M)$; comparator 223 receives components $I_D(M)$ and $Q_D(P)$ and provides signal $C_D(M,P)$; comparator 224 receives components $I_D(M)$ and $Q_D(M)$ and provides signal $C_D(M,M)$ Conveniently, the comparators provide the signals $C_D(\ldots,\ldots)$ according to the following definitions:

$$C_D(\ldots,\ldots)="+1" \text{ for } I_A(\ldots)-Q_D(\ldots)\geq 0 \quad (22)$$

$$C_D(\ldots,\ldots)="-1" \text{ for } I_D(\ldots)-Q_D(\ldots)<0 \quad (24)$$

In comparison to analog comparators 211, 212, 213, 214 described above, digital comparators 221, 222, 223, 224 substantially avoid the offset.

Combiner 227 receives signals $C_D(P,P)$, $C_D(P,M)$, $C_D(M,P)$ and $C_D(M,M)$ and provides signal $X'_D$ according to $$X'_D=\{+C_D(P,P)+C_D(P,M)-C_D(M,P)-C_D(M,M)\} \quad (26)$$

Hence, combiner 227 uses the above mentioned first summation pattern.

Delay stage 207 forwards signal $X'_D$ with a delay of N time slots T. The symbol $Z^{-N}$ is an operator of a Z-transformation. Persons of skill in the art can implement delay stage 207 without the need of detailed explanation herein, for example, by a shift register. The delay of stage 207 conveniently corresponds to the intrinsic input-to-output delay introduced in in-phase channel 291 (e.g., by DAC 293, LPF 295). This is convenient. As explained in connection with FIG. 3, the "input related" signal $X_D$ is combined with the delayed "output related" $X_A$.

Taking further into account any noise $x_D$ (lowercase) introduced, for example, by combiner 227 and delay stage 207, and the above mentioned scaling factor k, the signal $X_D$ forwarded to output 225 is estimated as:

$$X_D=k*X'_D*Z^{-N}+x_D \quad (28)$$

Combiner 228 receives signals $C_D(P,P)$, $C_D(P,M)$, $C_D(M,P)$ and $C_D(M,M)$ and provides signal $Y'_D$ according to $$Y'_D = \{+C_D(P,P) - C_D(P,M) + C_D(M,P) - C_D(M,M)\} \tag{30}$$

Hence, combiner 228 uses the above mentioned second summation pattern.

Delay stage 208 forwards signal $Y'_D$ to output 226 with the delay of N time slots T. Taking also into account any noise $y_D$ (lowercase) introduced, for example, by combiner 228 and delay stage 208, and the scaling factor k, the signal YD forwarded to output 226 is estimated as:

$$Y_D = k*Y'_D*Z^{-N} + y_D \tag{32}$$

N conveniently corresponds to the delay introduced in in-phase channel 292 (e.g., by DAC 294, LPF 296).

Giving the above definitions of $C_D(\ldots,\ldots)$ with possible values "+1" and "−1", signals $X_D$ and $Y_D$ can be any numbers from the set "−4", "−3", "−2", "−1", "0", "+1", "+2", "+3" and "+4".

The explanation now gives more details to FIG. 5. As mentioned above, adder 271 combines signal $X_A$ with the negative of signal $X_D$ to signal $\Delta X$, that is:

$$\Delta X = X_A - X_D \tag{34}$$

$$\Delta X = k*X'_A + x_A - (k*X'_D*Z^{-N} + x_D) \tag{36}$$

Assuming that the noise portions $x_A$ and $x_D$ substantially cancel each other, the last equation is simplified to:

$$\Delta X = k*(X'_A - X'_D*Z^{-N}) \tag{38}$$

$$\Delta X = k*X'_D*Z^{-N}(G_x - 1) \tag{40}$$

wherein gain $G_x$ is defined as $$G_X = \frac{X'_A}{X'_D * Z^{-N}} \tag{42}$$

Similarly, adder 272 combines signal $Y_A$ with the negative of signal $Y_D$ to signal $\Delta Y$, wherein noise portions $y_A$ and $y_D$ cancel, that is:

$$\Delta Y = Y_A - Y_D \tag{44}$$

$$\Delta Y = k*Y'_A + y_A - (k*Y'_D*Z^{-N} + y_D) \tag{46}$$

$$\Delta Y = k*(Y'_A - Y'_D*Z^{-N}) \tag{48}$$

$$\Delta Y = k*X'_D*Z^{-N}(G_y - 1) \tag{50}$$

$$G_Y = \frac{Y'_A}{Y'_D * Z^{-N}} \text{ (gain)} \tag{52}$$

As mentioned above, adder 273 forwards the difference $I^{\circ}*\Delta X^{\circ} - Q^{\circ}*\Delta Y^{\circ}$ to gain integrator 280 that provides gain control signal W (cf. FIG. 2) according to:

$$W = \int I^{\circ}*\Delta X^{\circ} - Q^{\circ}*\Delta Y^{\circ} \, dt \tag{56}$$

$$W = k*Z^{-N} * \int I^{\circ}*X'_D*(G_x - 1) - Q^{\circ}*Y'_D*(G_y - 1) \, dt \tag{58}$$

$$W = h*Z^{-N} * \int G_x - G_y \, dt \tag{60}$$

where h is a constant, providing, for example, that W becomes dimensionless.

As mentioned above, with gain control signal W supplied to amplifier 205, gain controller 200 provides a feedback loop that relates the gain L of amplifier 205 to W, preferably, according to:

$$L = 1 + W \tag{62}$$

In an ideal case, gains $G_X$ and $G_Y$ are substantially equal so that W substantially becomes zero and the gain L becomes 1. In case of a difference between $G_x$ and $G_y$, L is either increased or decreased so that the difference $G_x - G_y$ is reduced again. Preferably, W assumes values between −0.3 and +0.3 so that L assumes values between 0.7 and 1.3.

Every comparator shows an unwanted DC offset that significantly decreases the accuracy of the whole controller; therefore offset compensation is required.

Figure 9:
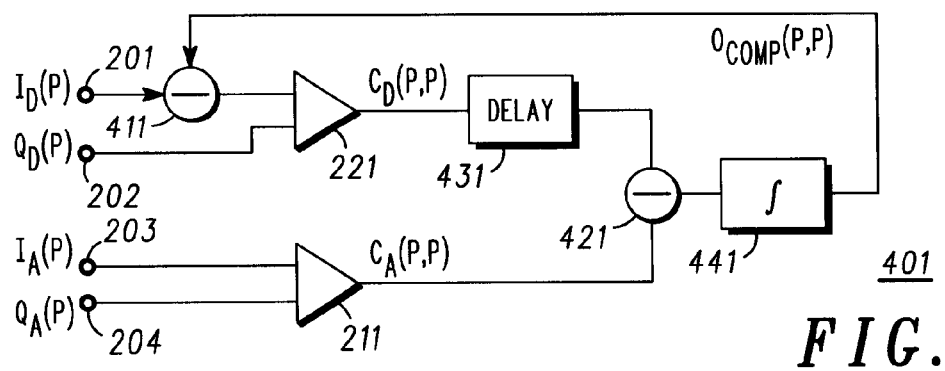
FIG. 9 illustrates a simplified block diagram of an offset compensation control loop in the gain controller of FIG. 5.

FIG. 9 illustrates a simplified block diagram of offset compensation control loop 401 in a further embodiment of gain controller 200 of FIG. 5. Control loop 441 is coupled to analog comparator 211 (cf. FIG. 6) and to digital converter 221 (cf. FIG. 8) and further comprises subtractor 411, delay stage 431, subtractor 421, and integrator 441. Similar control loops can be provided for comparators 212/222, 213/223 and 214/224.

As mentioned above, intermediate signal $C_A(P,P)$ comprises information about the offset $O(P,P)$ in analog comparator 211. Integrator 441 obtains an estimation of the magnitude and feeds back a compensation offset signal $O_{COMP}(P,P)$ to either one of the inputs of corresponding digital comparator 221. In the example of FIG. 9, this is implemented by subtracting $O_{COMP}(P,P)$ from $I_D(P)$ by subtractor 411. Delay stage 431 delays by the delay time introduced by channel 292.

Compensation offset signal $O_{COMP}(P,P)$ is the integral of the difference between the single-bit input related signal $C_D(P,P)$ and the single-bit output related signal $C_A(P,P)$, that is:

$$O_{COMP}(P,P) = \int [C_D(P,P) - C_A(P,P)] dt \tag{64}$$

As mentioned, the offset control loop 401 is, preferably, provided in pluralities. Using the terms "input related" and "output related" signals introduced above in connection with FIGS. 4 and 6, controller 200 is characterized by the following features: first integrator 441-1 provides a first offset compensation signal $O_{COMP}(P, P)$ as the integral of the difference between single-bit input related signal $C_D(P,P)$ and single-bit output related signal $C_A(P,P)$ (cf. equation (64)); second integrator 441-2 provides a second offset compensation signal $O_{COMP}(P,M)$ as the integral of the difference between single-bit input related signal $C_D(P,M)$ and single-bit output related signal $C_A(P,M)$; third integrator 441-3 provides a third offset compensation signal $O_{COMP}(M,P)$ as the integral of the difference between single-bit input related signal $C_D(M,P)$ and single-bit output related signal $C_A(M,P)$; and integrator 441-4 provides a fourth offset compensation signal $O_{COMP}(M,M)$ as the integral of the difference between single-bit input related signal $C_D(M,M)$ and single-bit output related signal $C_A(M,M)$.

First offset compensation signal $O_{COMP}(P,P)$ is subtracted (cf. FIG. 9, subtractor 411) from either input of digital comparator 221 (illustrated with $I_D(P)$input, $Q_D(P)$ can also be used); second offset compensation signal $O_{COMP}(P,M)$ is subtracted from either input of digital comparator 222; third offset compensation signal $O_{COMP}(M,P)$ is subtracted from either input of digital comparator 223; and fourth offset compensation signal $O_{COMP}(M,M)$ is subtracted from either input of digital comparator 224.

Preferably, gain controller 200 is implemented together with circuit 299 on a single monolithic chip. Having described the present invention in detail, the present invention can also be summarized as follows: Gain controller 200 for correcting a gain imbalance in radio circuit 299 that forwards a signal pair I,Q by first channel 291 and second channel 292 monitors differences between the overall gains $G_I$, $G_Q$ in channels 191, 292 and feeds back gain determining control signal W to one of the channels (e.g., to channel 292). First and second pluralities of single-bit comparators 221–224, 211–214 monitor the signal pair at channel inputs 281, 282 and at channel outputs 283, 284, respectively, at first sampling rate F and provide difference signals $\Delta X, \Delta Y$. Integrator 280 receives the difference signals and calculates the gain control signal W in second, decimated sampling rate $F_R$.

While the invention has been described in terms of particular structures and devices, those of skill in the art will understand based on the description herein that it is not limited merely to such examples and that the full scope of the invention is properly determined by the claims that follow.

Glossary of Terms

In the following, abbreviations, physical units, and writing conventions are listed alphabetically. This glossary is provided only for convenience.

A analog
$C_D(\ldots, \ldots)$ output signal of digital comparator
$C_A(\ldots, \ldots)$ output signal of analog comparator
$(\ldots, \ldots)$ (P,P) (P,M) (M,P) or (M,M) origin of I and Q signal components, respectively, supplied to comparator inputs
D digital
F first sampling rate
$F_R$ second, lower sampling rate
$G_I$, $G_Q$ overall gains
$G_X$ gain
$G_Y$ gain
$I_A, I_A(P), I_A(M)$ analog in-phase signal with P and M components
$I_D, I_D(P), I_D(M)$ digital in-phase signal with P and M components
I° conditioned in-phase signal
L gain
j index (cf. (1))
h constant
k scaling factor
$O(\ldots, \ldots)$ comparator offset
$O^{COMP}(\ldots, \ldots)$ compensation offset
P plus
$Q_A, Q_A(P), Q_A(M)$ analog quadrature signal with P and M components
$Q_D, Q_D(P), Q_D(M)$ digital quadrature signal with P and M components
$Q_{D\ MOD}$ modified signal
Q° conditioned quadrature signal
M minus
N delay duration by number of time slots T
R sampling rate decimation ratio, number of time slots in time frame
r index
SAMPLE sample signal
t time
$t_1, t_2, \ldots$ time points
T time slot
$T_R$ time frame
$T_{SIG}$ signal period length
$V_D$ digital signal at F
V° digital signal at lower sampling rate $F_R$
$V_{AVERAGE}$ average
W gain control signal
$X_A$, $X_D$ combination signals provided by combiner
$x_A, x_D, y_A, y_D$ noise introduced by combiner
$\Delta X, \Delta X°$ difference signal
$Y_A, Y_D$ combination signal provided by combiner
y noise introduced by combiner
$\Delta Y, \Delta Y°$ difference signal
$Z^{-N}$ delay by N time slots T
\* multiplication
/ and division
$\Sigma$ sum of multiple summands
$\int$ integral

What is claimed is:

1. Gain controller for a circuit that forwards a signal pair by a first channel and a second channel by converting said signal pair from a digital form to an analog form, wherein said gain controller monitors differences between overall gains in said channels and corrects gain imbalance by feeding back a gain determining control signal to at least one of said channels, said gain controller comprising:
   a plurality of digital comparators at inputs of said channels;
   a plurality of analog comparators at outputs of said channels; and
   a plurality of offset control loops, one for each combination of analog and digital comparators, said loops to determine intrinsic offsets of said analog comparators and to subtract offset compensation signals from said digital comparators.

2. The gain controller according to claim 1, wherein said first channel is an in-phase channel and said second channel is a quadrature channel, said signal pair in said digital form having a first input signal being an in-phase input signal and a second input signal being a quadrature input signal; said signal pair in said analog form having a first output signal being an in-phase output signal and a second output signal being a quadrature output signal.

3. The gain controller according to claim 2, wherein in said plurality of digital comparators,
   a first digital comparator receives a first component of said in-phase input signal and a first component of said quadrature input signal and provides a first single-bit input related signal;
   a second digital comparator receives said first component of said in-phase input signal and a second component of said quadrature input signal and provides a second single-bit input related signal;
   a third digital comparator receives a second component of said in-phase input signal and said first component of said quadrature input signal and provides a third single-bit input related signal; and
   a fourth digital comparator receives said second component of said in-phase input signal and said second component of said quadrature input signal and provides a fourth single-bit input related signal.

4. The gain controller according to claim 3, wherein in said plurality of analog comparators,
   a first analog comparator receives a first component of said in-phase output signal and a first component of said quadrature output signal and provides a first single-bit output related signal;
   a second analog comparator receives said first component of said in-phase output signal and a second component of said quadrature output signal and provides a second single-bit output related signal;

a third analog comparator receives a second component of said in-phase output signal and said first component of said quadrature output signal and provides a third single-bit output related signal; and a fourth analog comparator receives said second component of said in-phase output signal and said second component of said quadrature output signal and provides a fourth single-bit output related signal.

5. The gain controller according to claim 4, wherein in said plurality of offset control loops, a first integrator provides a first offset compensation signal as said integral of the difference between said first single-bit input related signal and said first single-bit output related signal;

a second integrator provides a second offset compensation signal as the integral of the difference between said second single-bit input related signal and said second single-bit output related signal;

a third integrator provides a third offset compensation signal as the integral of the difference between said third single-bit input related signal and said third single-bit output related signal; and a fourth integrator provides a fourth offset compensation signal as the integral of the difference between said fourth single-bit input related signal and said fourth single-bit output related signal.

6. The gain controller of claim 5, wherein said first offset compensation signal is subtracted from either input of said first digital comparator;

said second offset compensation signal is subtracted from either input of said second digital comparator;

said third offset compensation signal is subtracted from either input of said third digital comparator; and said fourth offset compensation signal is subtracted from either input of said fourth digital comparator.

* * * * *